US 9,277,823 B2

(12) United States Patent
Griggs, Jr.

(10) Patent No.: US 9,277,823 B2
(45) Date of Patent: Mar. 8, 2016

(54) MOTOR ASSEMBLY FOR RECLINING FURNITURE

(71) Applicant: Billy Joe Griggs, Jr., Pulaski, TN (US)

(72) Inventor: Billy Joe Griggs, Jr., Pulaski, TN (US)

( * ) Notice: Subject to any disclaimer, the term of this patent is extended or adjusted under 35 U.S.C. 154(b) by 0 days.

(21) Appl. No.: 14/609,390

(22) Filed: Jan. 29, 2015

(65) Prior Publication Data

US 2015/0208805 A1     Jul. 30, 2015

Related U.S. Application Data

(60) Provisional application No. 61/932,952, filed on Jan. 29, 2014.

(51) Int. Cl.
*A47C 1/032*     (2006.01)
*A47C 7/00*     (2006.01)

(52) U.S. Cl.
CPC ......... *A47C 1/03222* (2013.01); *A47C 1/03211* (2013.01); *A47C 7/00* (2013.01); *Y10T 74/18568* (2015.01); *Y10T 74/20* (2015.01)

(58) Field of Classification Search
CPC ............... A47C 1/0345; A47C 1/0355; A47C 1/03211; A47C 1/03222
USPC .................. 297/85, 85 M; 403/187, 205, 230
See application file for complete search history.

(56) References Cited

U.S. PATENT DOCUMENTS

| | | | | |
|---|---|---|---|---|
| 1,736,878 A | * | 11/1929 | Duvall | 5/299 |
| 2,944,595 A | | 5/1957 | Barabas et al. | |
| 3,392,848 A | * | 7/1968 | McConnell et al. | 403/315 |
| 4,696,512 A | * | 9/1987 | Burnett et al. | 297/68 |
| 4,852,939 A | * | 8/1989 | Krauska | 297/71 |
| 5,527,095 A | * | 6/1996 | Marshall et al. | 297/270.1 |
| 5,651,580 A | * | 7/1997 | LaPointe et al. | 297/85 M |
| 6,557,934 B2 | | 5/2003 | Wiecek | |
| 6,655,732 B1 | * | 12/2003 | LaPointe | 297/85 L |
| 7,338,132 B2 | * | 3/2008 | LaPointe | 297/423.26 |
| 8,979,186 B2 | * | 3/2015 | Walz et al. | 297/85 M |
| 2001/0035668 A1 | * | 11/2001 | Gaffney et al. | 297/85 |
| 2004/0089784 A1 | * | 5/2004 | Garrido | 248/424 |
| 2011/0248547 A1 | | 10/2011 | LaPointe et al. | |

OTHER PUBLICATIONS

Flickr, Motorized Recliner Mechanism WJ-886D, Nov. 12, 2007, retrieved from the Internet: <https://flickr.com/photos/22398728@N05/2184300185>.

* cited by examiner

*Primary Examiner* — Peter Brown
(74) *Attorney, Agent, or Firm* — Wayne Edward Ramage; Baker Donelson

(57) ABSTRACT

A motor assembly for reclining furniture includes a motor having one or more first fittings that correspond to one or more second fittings comprised within reclining furniture actuation mechanism and the first and second fittings are configured to be mutually connectable without tools or fasteners.

4 Claims, 8 Drawing Sheets

MOTOR ASSEMBLY FOR RECLINING FURNITURE

CROSS-REFERENCE TO RELATED APPLICATIONS

This application claims priority to U.S. Provisional Application No. 61/932,952, filed Jan. 29, 2014, and which is incorporated by reference as if fully set forth herein.

BACKGROUND

1. Field

The present disclosure relates generally to motor assemblies for reclining furniture, and particularly to motor assemblies which may be installed in reclining furniture without the use of tools or externally applied fasteners.

2. Description of the Problem and Related Art

Recliner chairs and sofas are popular furniture pieces found in many living rooms across the country, as they can provide a level of comfort and relaxation that is considered unmatched by traditional chairs and sofas by many users. Over the past several years, recliner chairs and sofas have continued to evolve towards larger and heavier models that provide greater cushioning and space for their occupants, often resulting in more complex and robust recliner mechanisms and frames needed to support and carry the additional weight. However, While the exterior and visible portions of reclining furniture continues to change, the underlying recliner mechanisms Which elevate and carry the various support panels (i.e. the seat rest, the back rest, the foot rest, etc.) continue to be divided into two basic types; manual actuation and powered actuation.

Manually-actuated recliners are the more popular of the two types of recliners, primarily for cost and simplicity reasons. The number of recliner models that are originally manufactured for powered actuation are often only available in limited models, styles and sizes, and typically cost several hundreds of dollars more that manually-actuated models. Consequently, most recliner models are originally manufactured for manual actuation. Even if the model, style and size of a particular manually-actuated recliner includes an option for powered actuation, special modifications must be made at the factory prior to assembly to make the piece suitable for powered actuation. As a result, many recliner models with power actuation often require special ordering and extended wait times to before the furniture can be delivered to the point of sale.

There are times, however, when a customer may change his or her mind after ordering a lower-cost manually actuated recliner, and Wish instead to purchase the same recliner with powered actuation, and preferably for the same cost differential. Even if available, however, this change in the sales order may still result in additional costs and significant delivery delays, which may prompt the customer to cancel the sale altogether and purchase from another supplier. In other cases, the end user may change his mind after taking delivery and using the recliner for a period of time, and then decide that powered actuation is a preferred option and worth the additional cost. However, since the reclining furniture piece has already been delivered, the time, effort and cost to ship the recliner back to the factory for retrofitting to powered actuation, in addition to the cost of the conversion itself, is prohibitive.

Moreover, retail sellers often must pre-order either manual or powered recliners, Where display floor space is limited. A customer may prefer a certain style that is only shown in manual configuration. Even if that style is available in a powered version (Where often it is not), the customer is forced to wait 2-3 months for an eventual delivery. Such a delay can lead to customer frustration at the least and a lost sale at the worst. The retail seller lacks a method of converting on-site a manual recliner to a powered recliner.

Accordingly, it can be seen that a need exists for a method and apparatus for converting a recliner from manual actuation to powered actuation at a field or point-of-sale location that addresses the foregoing and various other related and unrelated problems in the art.

BRIEF DESCRIPTION OF THE DRAWINGS

The novel motor assembly for reclining furniture is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the motor assembly for reclining furniture and their advantages are best understood by referring to FIGS. 1 through 9A of the drawings. The elements of the drawings are not necessarily to scale, emphasis instead being placed upon clearly illustrating the novel features and principles of operation. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

Figure 1A:
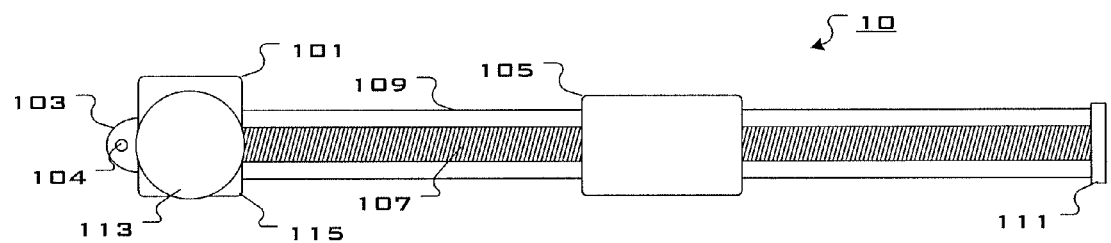
FIGS. 1A & B depict an exemplary recliner motor assembly.
Figure 1B:
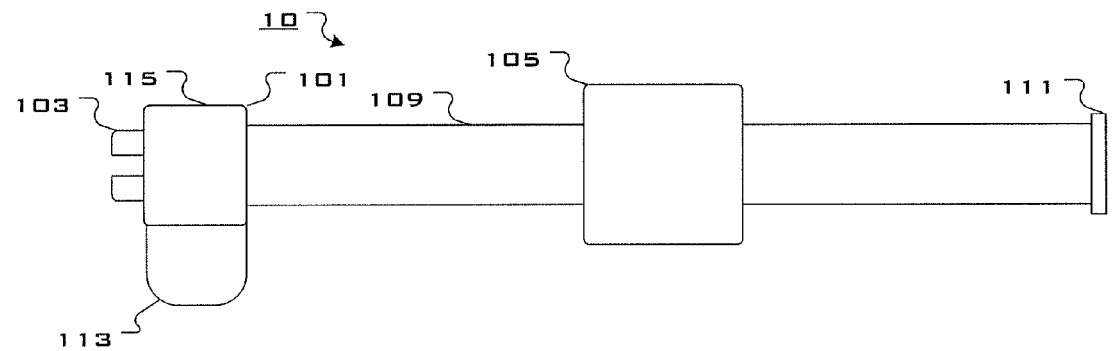

FIG. 1 depicts a motor assembly 10 for use in typical motorized reclining furniture. A motor 113, along with a gear box 115 is mounted to one end of a slide rail 109 such the motor 113 drives a screw 107. A trolley 105 is slidably engaged with the slide rail 109 and threadably engaged with the screw 107 such that rotation of the screw 107 in either direction causes the trolley to move along the slide rail 109 in either direction. The motor assembly 10 is also equipped with a cap 111 at the opposite end of the slide rail 109. Additionally, a clevis 103 extends from the gear box housing 115 to permit connection to the recliner mechanism as will be described in detail below.

Figure 2:
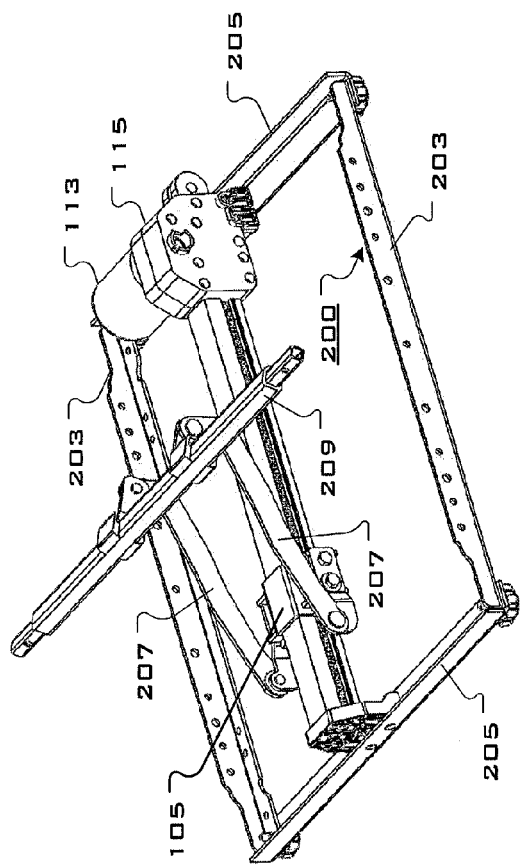
FIG. 2 shows one exemplary embodiment of a motor assembly configured for installation in a recliner.

With reference to FIG. 2, a first embodiment of the motor assembly 10 is shown in which it the assembly is attached to a base frame 200. This embodiment is particularly suited for use with reclining furniture that maintains a certain distance from a wall when actuated, known in the industry as a "wallaway". It can be seen the motor assembly 10 is seated within the frame 200 which is formed from two side rails 203 and two end rails 205.

Figure 3B:
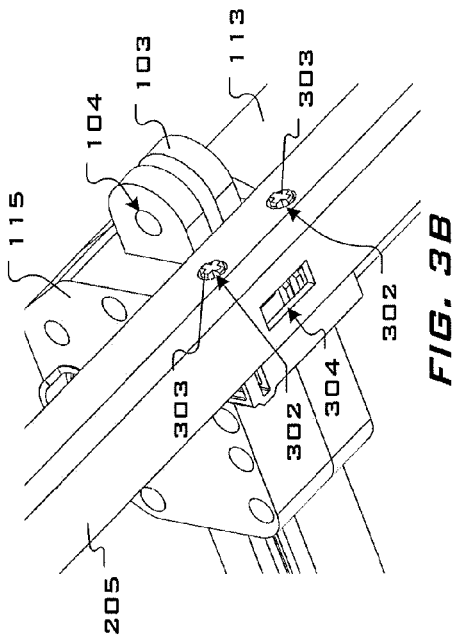
FIGS. 3A & B show exemplary fittings for the motor assembly gear box housing and base frame.
Figure 3A:
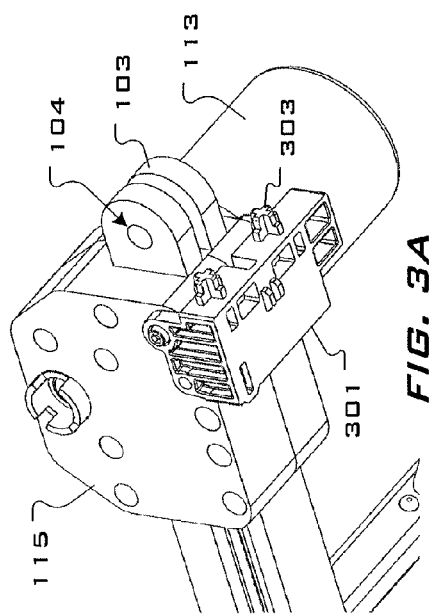

With reference to FIGS. 3A & B, and 5A-D, either end of the motor assembly 10 is seated on opposing end rails 205. In this embodiment, the motor assembly 10 includes a first fitting piece 301 extending from the gear box housing 115. The fitting 301 comprises one or more prongs 303 or bosses that extend axially outward, and are dimensioned to be received within one or more openings 302, 304 defined within a wall of the end rail 205.

Figure 4A:
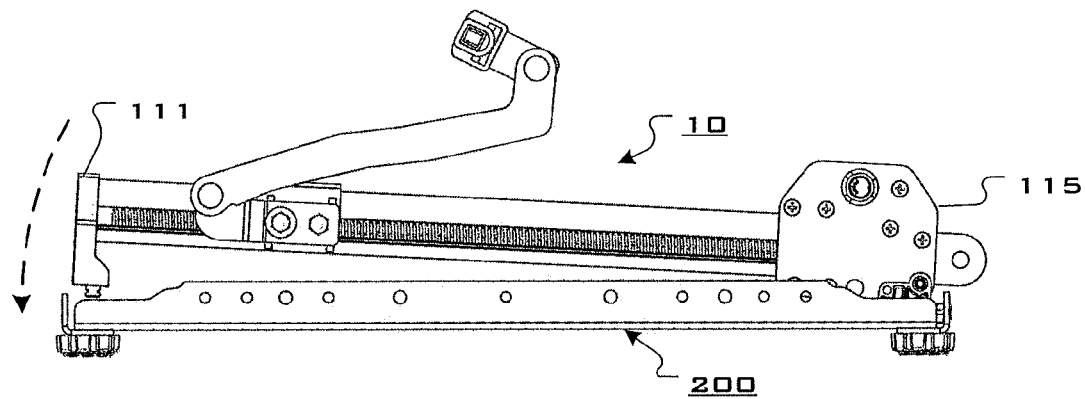
FIGS. 4A & B illustrate a manner by which to seat the motor assembly of FIG. 2 in a base frame.
Figure 4B:
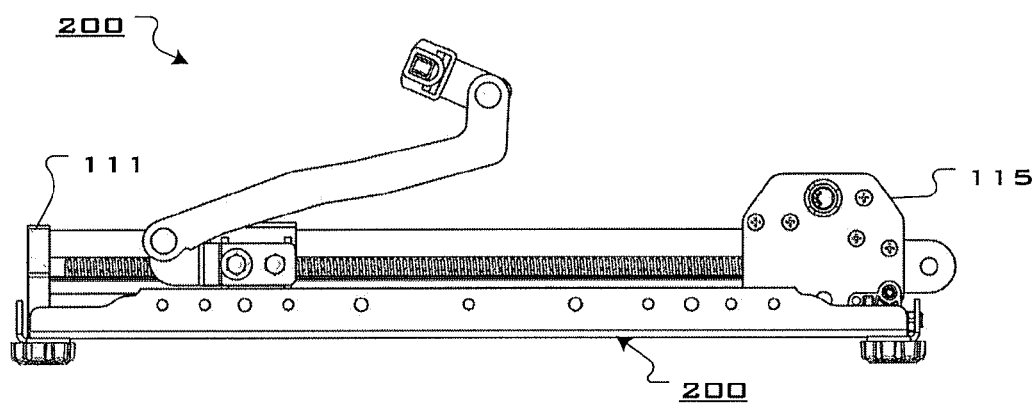
FIG. 4C show another example of fitting for connecting the motor assembly to the base frame.

At the opposite end of the slide rail 109, the cap 111 may be configured with a boss 501 having a flange and extending downward that is dimensioned to be received in an opening 502 defined in a horizontal portion of the end rail 205. The boss is of a height to extend through the opening 504 and below the lower surface of the rail 205. A slide 503 having keyhole-type opening 504 defined therethrough comprising a large portion and a small portion. The large portion is dimensioned to be placed over the flange of the boss 501 as it extends beyond the bottom surface of the rail 205. The small portion is dimensioned to be smaller than the dimensions of the flange such that the slide 503. Once the boss 501 is inserted through the large portion of the slide opening 504, the slide 501 is moved so that the small portion of the opening surrounds the boss 501, thus retaining the cap 111 against the rail 205. FIGS. 4A & B simply illustrate the manner of inserting the motor assembly 10 into the base frame 200 where the gear box housing 115 is place on its end rail 205 with the prong(s) 303 inserted into their respective openings 302 in the rail 205. Then, the opposite end of the assembly 10 may be lowered into place with the end cap 111 seated against its rail 205 as described above.

Figure 4C:
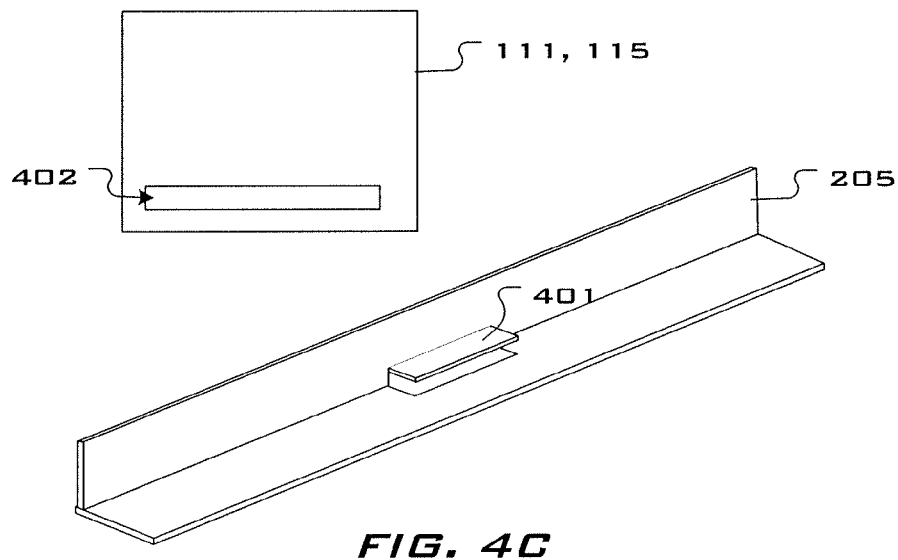
Figure 5A:
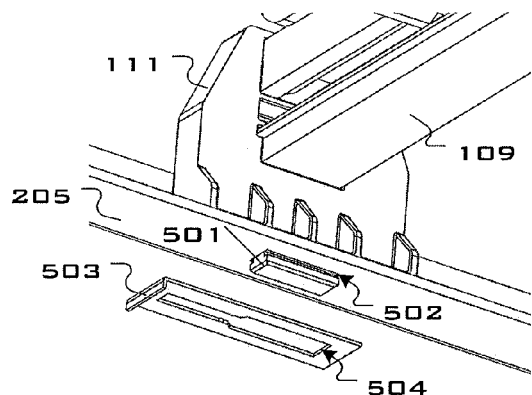
FIGS. 5A through D depict one exemplary configuration for connection an end of the motor assembly to the base frame.
Figure 5B:
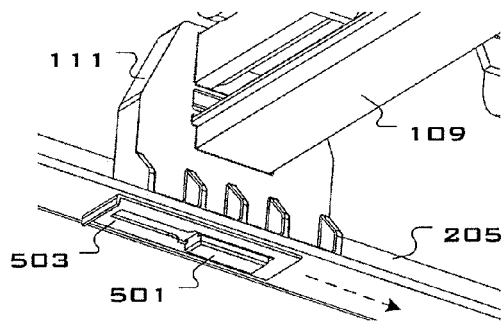
Figure 5C:
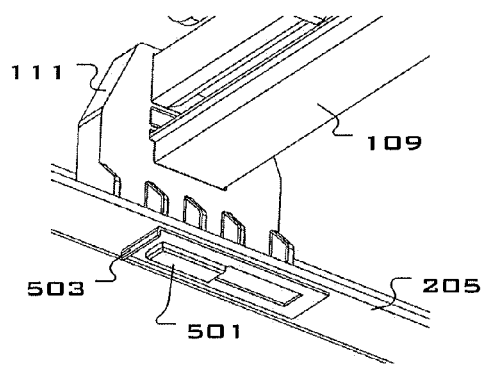
Figure 5D:
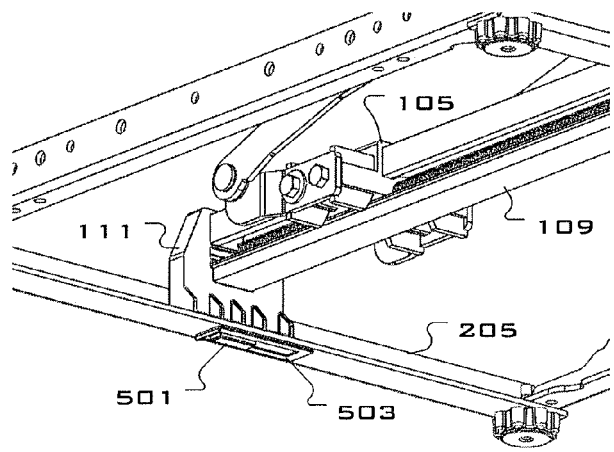

FIG. 4C illustrates an alternative configuration for the cap 111 and the gear box housing 115 to connect to the end rails 205. In this embodiment, the end rails 205 are configured with an inward extending tab 401. The cap 111, and the gear box housing 115 are formed with a slot that receives the tab 401 and holds the motor assembly 10 against the base frame.

Figure 6A:
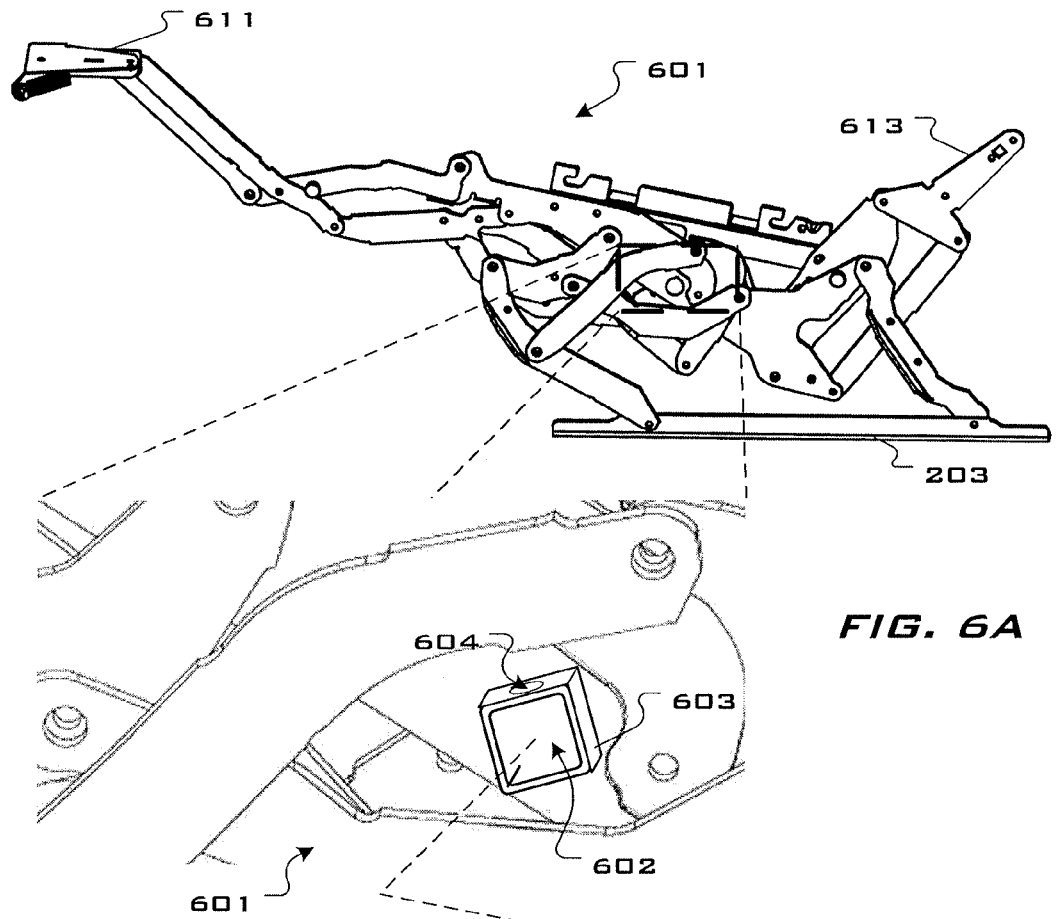
FIGS. 6A & B depict how the motor assembly of FIG. 2 is fitted with a recliner actuation mechanism.
Figure 6B:
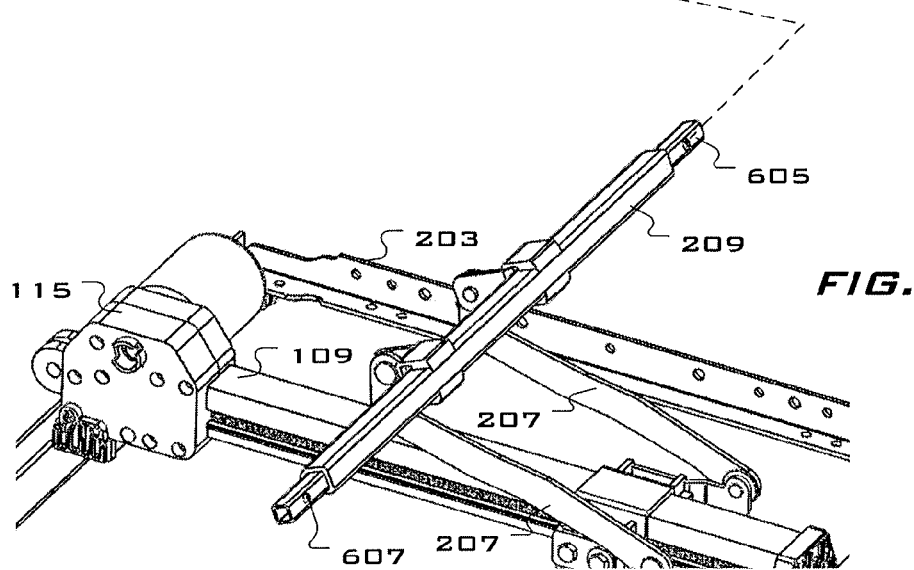

Returning to FIG. 2, the trolley 105 in this embodiment is pivotally coupled to respective ends of a pair of swing arms 207. The opposite ends of the swing arms 207 are connected to a transverse, elongated linkage member 209. FIGS. 6A & B show this embodiment in relation to a recliner actuation mechanism 601, which itself is connected to the base frame 200. It will be appreciated that although only one mechanism is shown, reclining furniture is typically configured with a pair of opposing mechanisms. Accordingly, the following description of the fittings and connections between the motor assembly 10 and the mechanism 601 will apply to both mechanisms.

Recliner mechanism 601 typically includes a footrest attachment flange 611 for supporting a footrest (not shown) and a seat back attachment bracket 613. Recliner mechanism 601 may be configured with a female fitting 603 that is dimensioned to receive a male fitting 605 extending from the end of the transverse linkage member 209. In order to secure the connection, the male fitting 605 may be configured with a spring pin 607 biased away from the male member 605. The female fitting 603 includes a detente 604 through which the spring pin 607 may extend. As such, when the male fitting 605 is inserted into the female fitting 603, the spring pin 607 is urged toward the interior of the fitting. When the male fitting is inserted far enough, the spring pin meets the opening 604 and is free to extend outward, latching the male fitting within the female fitting 603.

Accordingly, it will be appreciated that the motor assembly 10, thus configured, may be installed by simply fitting the assembly into place. Also, the assembly 10 may be easily removed from the recliner as well by unfitting the connections by hand. In this way, a recliner may be easily converted from a manually actuated recliner to a power actuated recliner without tools, or extraneous fasteners.

Figure 7A:
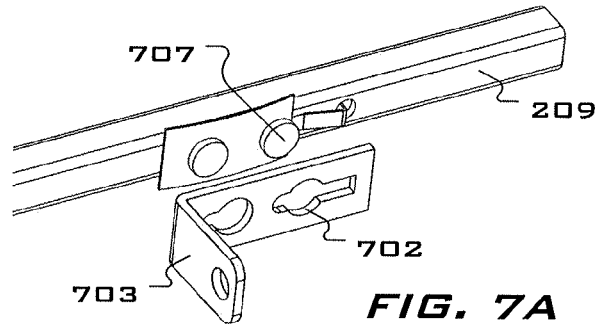
FIGS. 7A & B provide one exemplary method for connecting a transverse linkage member to the motor assembly.
Figure 7B:
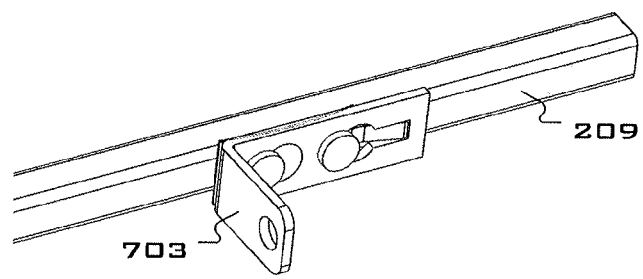

Turning now to FIGS. 7A & B, an exemplary arrangement for connecting the swing arm 207 to the transverse linkage member 209. An attachment bracket 703 is pivotally connected to the end of each swing arm 207 and includes one or more openings 702 defined in a flange that correspond to one or more rivets 707 extending from the transverse linkage member 209. The openings 702 receive the rivets 707 that include a circular flange that retain the bracket against the linkage member 209.

Figure 8:
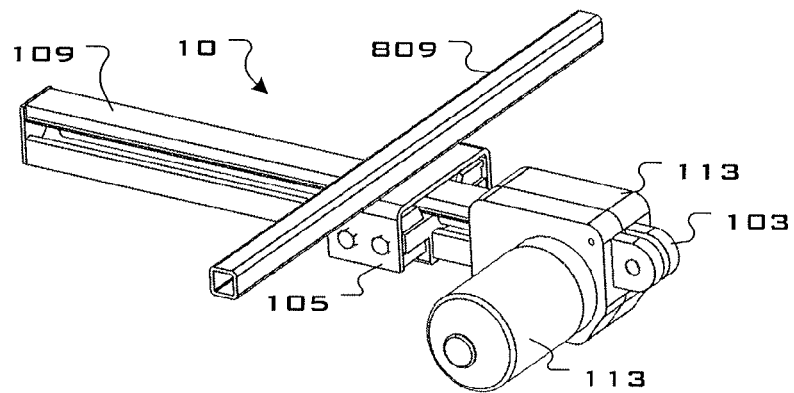
FIG. 8 shows another embodiment of a motor assembly.
Figure 9:
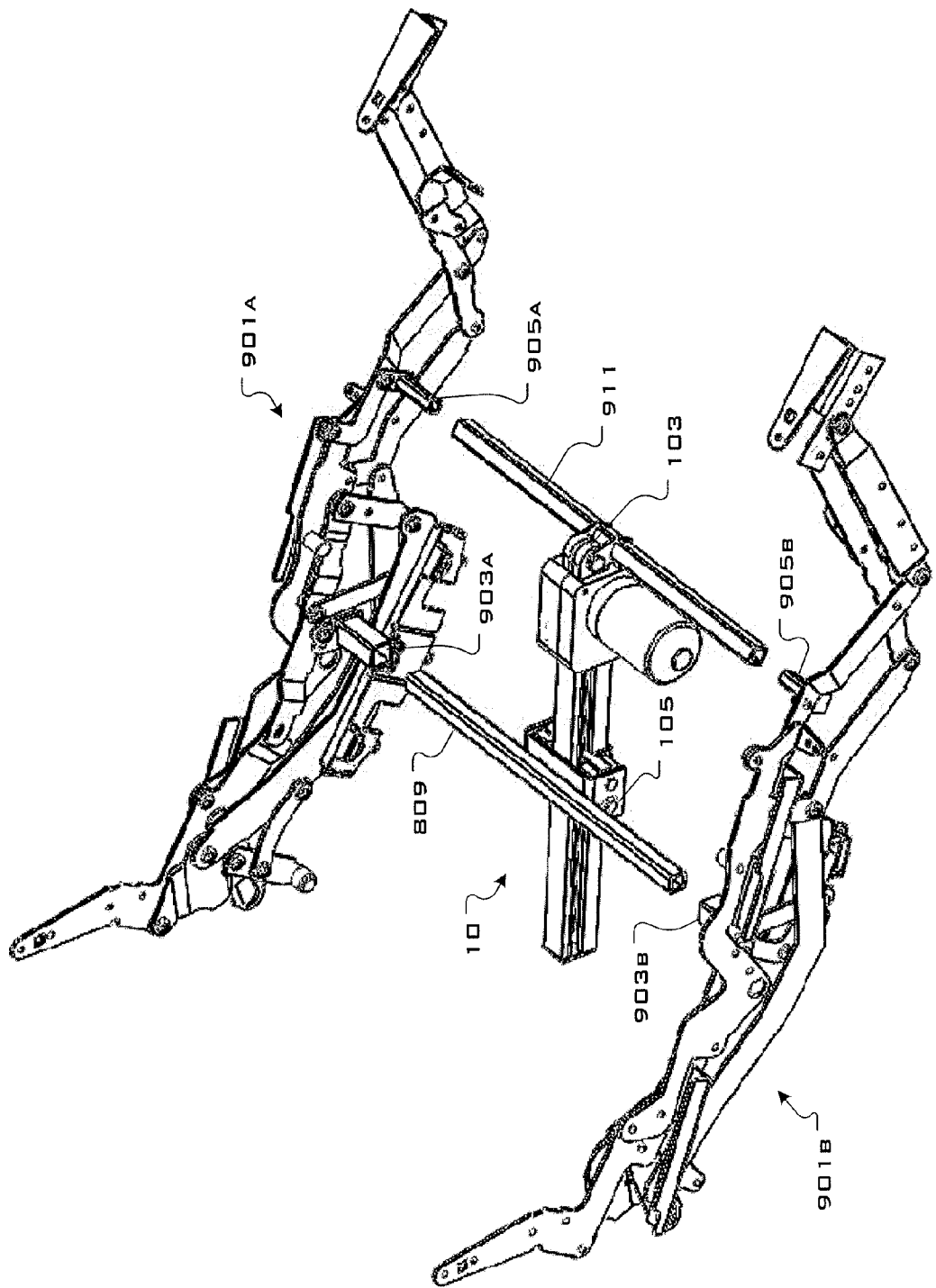
FIGS. 9 & 9A illustrate the connections between the motor assembly of FIG. 8 and recliner actuation mechanisms for a rocker recliner.
Figure 9A:
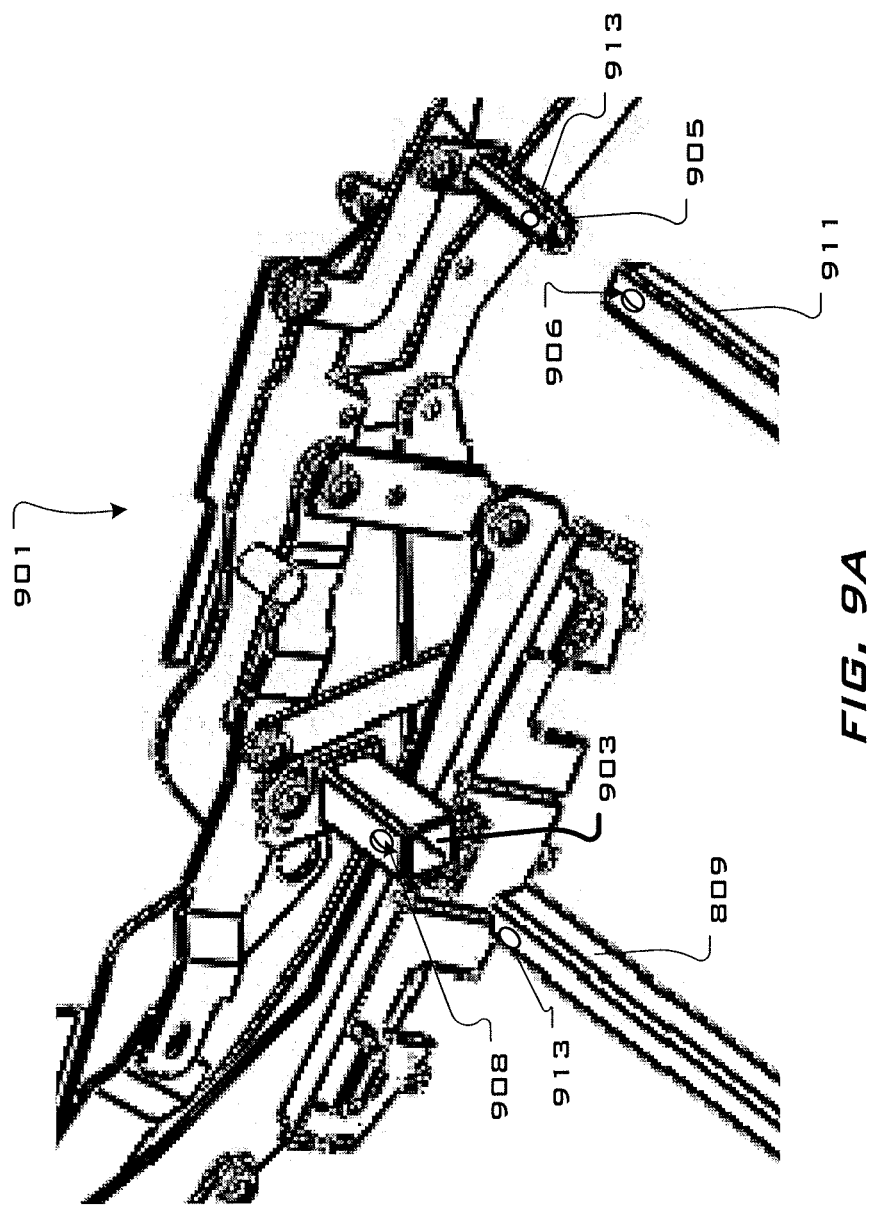

A further embodiment is illustrated in FIGS. 8 through 9A, where motor assembly 10 comprises a transverse linkage member 809 fixedly attached to the trolley 105. As shown in FIG. 9, opposing recliner mechanisms 901a, b are configured for a rocker recliner, to be attached to a rocker base (not shown). Each mechanism 901 comprises an inward extending female fitting 903a, b that is dimensioned to receive the end of transverse linkage member 809 and may be configured with a spring pin latching arrangement as described above and as shown in FIG. 9A. In this embodiment, a second transverse linkage bar 911 is hingedly connected to the clevis 103 of the gear box housing 115. The recliner mechanism 901 a, b may also include a male fitting 905a, b that is received in a female fitting in each end of the second transverse linkage bar 911. Again, the respective fittings may include a spring pin latching arrangement as shown in FIG. 9A. Again, thus configured, the motor assembly may be easily and quickly installed in a recliner by simply fitting the connections in place without tools or extraneous fasteners.

As described above and shown in the associated drawings, the present invention comprises a motor assembly for reclining furniture. While particular embodiments have been described, it will be understood, however, that any invention appertaining to the assembly described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A motor assembly for actuating reclining furniture actuation mechanisms, said motor assembly comprising:
   a motor;
   a slide rail to which said motor is mounted, said slide rail comprising a first end and second end;
   a trolley configured to be driven by said motor in a bidirectional, linear motion along said slide rail and configured to be coupled to said reclining furniture actuation mechanisms with at least one self-latching coupling;

wherein the first end of the slide rail is attached to a first frame member of said reclining furniture by insertion of one or more male connecting elements into one or more into one or more corresponding female connecting elements;

further wherein the second end of the slide rail is attached to a second frame member of said reclining furniture by insertion of a boss with a flange on the second end through an opening in the second frame member, with a locking slide with a keyhole-opening engaging the flange to secure the boss.

2. The motor assembly of claim 1, further comprising an elongated stretcher member transversely mounted to said trolley having outward ends configured to be coupled to said reclining furniture actuation mechanism with self-latching couplings.

3. The motor assembly of claim 1, further comprising at least one linkage member pivotally connected at one end to said trolley, and connected at an opposite end to an elongated transverse stretcher member coupled to said reclining furniture actuation mechanism, said opposite end connected to said transverse stretcher member by one or more self-latching couplings.

4. A motor assembly for converting reclining furniture from manual operation to powered actuation, comprising:

a motor mechanically connected to a moveable trolley mounted on a slide rail, said trolley having one or more first fittings adapted to be mutually connectable without a tool or fastener to one or more second fittings on a reclining furniture actuation mechanism on said reclining furniture;

wherein said slide rail has a first end with one or more third fittings and a second end with one or more fourth fittings, the one or more third fittings of the first end of the slide rail adapted be mutually connectable to complementary fittings on a first structural member of said reclining furniture, and the one or more fourth fittings of the second end of the slide rail adapted to be mutually connectable to complementary fittings on a second structural member of said reclining furniture;

further wherein connection of the slide rail to the first frame member and second frame member and connection of the trolley to the reclining furniture actual mechanism converts the reclining furniture from manual operation to powered actuation;

further wherein the first end of the slide rail and the second end of the slide rail remain fixed in position and fixed in distance from each other during powered actuation.

* * * * *